United States Patent [19]

Katz et al.

[11] Patent Number: 5,800,872
[45] Date of Patent: Sep. 1, 1998

[54] AQUEOUS POLYURETHANE DISPERSIONS CONTAINING URETIDIONE

[75] Inventors: Lawrence E. Katz, Orange; Augustin T. Chen, Cheshire; John W. Reisch, Madison; Richard J. Feegel, West Haven, all of Conn.

[73] Assignee: Arco Chemical Technology, L.P., Greenville, Del.

[21] Appl. No.: 664,734

[22] Filed: Jun. 17, 1996

[51] Int. Cl.⁶ .................. B05D 3/02; C08J 3/00; C08K 3/20; C08L 75/00

[52] U.S. Cl. .................. 427/385.5; 427/372.2; 524/539; 524/591; 524/839; 524/840

[58] Field of Search .................. 427/385.5, 372.2; 524/539, 591, 839, 840

[56] References Cited

U.S. PATENT DOCUMENTS

| | | | |
|---|---|---|---|
| 3,412,054 | 11/1968 | Milligan et al. | 524/591 |
| 4,184,989 | 1/1980 | Flakus et al. | 260/29.27 N |
| 5,098,983 | 3/1992 | Mosbach et al. | 528/59 |
| 5,563,206 | 10/1996 | Eicken et al. | 524/590 |

OTHER PUBLICATIONS

Odian, G., Principles of Polymerization, 1981, pp. 20–25 and 279–281.

*Primary Examiner*—Patrick D. Niland
*Attorney, Agent, or Firm*—Dale Lynn Carlson Wiggin & Dana

[57] ABSTRACT

The present invention relates to a composition being an aqueous dispersion of a polyurethane in water, said composition comprising water and the reaction product of (a) a water-dispersible isocyanate-terminated polyurethane prepolymer having an isocyanate content of between 1 and 15% by weight. The prepolymer comprises the following: an organic polyisocyanate adduct mixture having an average isocyanate functionality of between 2.0 and 4.0, and (b) an isocyanate reactive chain extender having a specified ratio of isocyanate reactive moiety to isocyanate index of the polyisocyanate adduct mixture. The polyisocyanate mixture must contain some dimer; however, other polyisocyanates, such as diisocyanates and polyisocyanate trimers, are advantageously added to the mixture. Also disclosed is a process for preparing this composition, and a method for coating a substrate with the composition.

7 Claims, 1 Drawing Sheet

AQUEOUS POLYURETHANE DISPERSIONS CONTAINING URETIDIONE

CROSS-REFERENCE TO RELATED APPLICATION

This application claims the benefit of U.S. Provisional Pat. application No. 60/006,829, filed Nov. 16, 1995.

FIELD OF THE INVENTION

This invention relates generally to aqueous polyurethane dispersions, and more particularly, to aqueous polyurethane dispersions that contain polyisocyanate dimer and are useful as coating compositions, advantageously exhibiting enhanced cross-linking properties relative to conventional aqueous polyurethane dispersions.

BACKGROUND OF THE INVENTION

Aqueous polyurethane dispersions are well known and are used in the production of a variety of useful polyurethane products, including, for example, coatings, films, adhesives, sealants, and the like, collectively referred to as so-called "ACS". Such dispersions are typically produced by dispersing a water-dispersible, isocyanate-terminated polyurethane prepolymer in an aqueous medium together with an active hydrogen containing chain-extender.

The prepolymers used in the preparation of the dispersions are generally substantially linear, that is to say difunctional, and are typically obtained by reacting an excess of a diisocyanate with an isocyanate-reactive component comprising a polymeric diol in the presence of a reactive compound, for example a diol, containing an ionic or nonionic hydrophilic group or site.

Attempts to introduce higher functionality into the dispersed polyurethanes, in an effort to enhance the physical properties of the resulting ACS or shorten the curing time for these products, have not been entirely successful. One method of increasing the functionality is by incorporating a higher functionality polyol, such as a triol or tetrol, into the prepolymer, and the use of such polyfunctional active hydrogen compounds in the preparation of ionic polyurethane dispersions has been described in U.S. Pat. No. 4,554,308. The amount of polyfunctionality that can be introduced in this way is limited by the tendency of the more highly cross-linked prepolymers to gel and to form large micelles when dispersed, resulting in poor film-forming properties for this dispersion.

Another method of introducing higher functionality employs a linear prepolymer in conjunction with a trifunctional chain extender, such as diethylene triamine. This approach has been described in U.S. Pat. Nos. 4,203,883 and 4,408,008. One problem associated with these triamine cross-linked urethane dispersions is that they tend to form gels prior to use and they tend to provide poor coalescence of the films on substrates during use.

Yet another method of introducing higher functionality uses a triisocyanate in the prepolymer preparation, but this methodology causes similar problems to those that result when using a triol or tetrol in the preparation of the prepolymer, including gelation and poor dispersion of the prepolymer due to large micelle formation.

A different method of incorporating triisocyanates has been described in U.S. Pat. No. 4,507,431 which describes a process for preparing aqueous dispersions of cross-linked polyurethane ionomers. These dispersions are made by mixing an isocyanate containing prepolymer dissolved in a water-miscible organic solvent having a boiling point of from 20° to 100° C. with a polyfunctional polyisocyanate cross-linking compound having an isocyanate functionality of about 2.2 to 4. The isocyanate-containing prepolymer is prepared from a linear polyhydroxy compound having a molecular weight of from 800 to 5000, and the prepolymer has exclusively aliphatic or cycloaliphatic terminal isocyanate groups in amounts from 0.1 to 2% by weight incorporated therein by employing an aliphatic diisocyanate and/or cycloaliphatic diisocyanate compound alone as the diisocyanate reactant with said polyhydroxy compound or in conjunction with a non-aliphatic or non-cycloaliphatic diisocyanate reactant, and containing salt groups in amounts of from 0.02 to 1% by weight; so that there are from 0.1 to 1.5 isocyanate groups of said polyisocyanate per isocyanate group of said prepolymer; dispersing the resulting solution in from 40 to 80% by weight, based on the polyurethane prepolymer and the polyisocyanate, of water and evaporating the organic solvent. Unfortunately, evaporation of the solvent in the production of the aqueous dispersion in accordance with the teachings of the '431 patent is undesirable from an environmental standpoint.

Still another method of preparing aqueous polyurethane dispersions is disclosed in U.S. Pat. No. 5,169,895. The '895 patent discloses an aqueous dispersion of a water-dispersible polyurethane, wherein the polyurethane represents the reaction product of (a) a water-dispersible isocyanate-terminated polyurethane prepolymer having an isocyanate content of 2.1 to 10% by weight, (b) an organic polyisocyanate having an average isocyanate functionality of 2.1 to 4.0, and (c) an active hydrogen-containing chain extender, but with the provision that the polyurethane is prepared in the absence of the steps recited to prepare the polyurethane dispersion in the above-described '431 patent. Examples of the organic polyisocyanate of component (b) of the '895 patent include the trimers of 1,6-hexamethylene diisocyanate (so-called "HDI"), isophorone diisocyanate (so-called "IPDI"), and 2,4-toluene diisocyanate, biuret-modified HDI, and the adduct of 2,4-toluene diisocyanate and trimethylolpropane, as recited at column 5, lines 27–31 of the '895 patent.

Another approach to increased cross-linking is disclosed in U.S. Pat. No. 4,184.989 which claims a process for the preparation of a solvent-free exclusively aqueous dispersion of a thermally linkable storage stabile, light stabile polyurethane. The process is comprised of the following: (a) reacting a hydroxy group containing polyester composition with a diisocyanate in a ketone solvent at 10°–50° C. (such that there is 1.5-2.0 isocyanate equivalents per hydroxyl group), (b) the intermediate reaction product is thereafter reacted with a primary amine, secondary amine, or diol in such an amount that 30–70% of the existing free isocyanate groups on said reaction product are reacted and the resultant reaction product is dispersed with an anionic surfactant in water and the said ketone solvent removed. The improvement which comprises employing as the diisocyanate the uretidone of isophorone diisocyanate. These coating compositions require heating at 150°–180° C. for 10–15 minutes in order to thermally dissociate the uretidione into isocyanate moieties that can link by reaction with isocyanate reactive groups. Unfortunately, the high temperature needed to cure this coating precludes its use on many organic substrates. The isocyanates that are formed, via thermal dissociation of the uretidione linkages, break the polymer into smaller pieces, thereby lowering the overall molecular weight of the coating; this process is not expected to form many cross-links, instead the isocyanate can chain extend.

A related method for introducing higher cross-linking is disclosed in U.S.Pat. No. 5,098,983 which claims polyisocyanate mixtures for use as coatings, and high molecular weight plastic compositions. The improvement in properties is attributed to the simultaneous presence of three different reactive groups; namely: isocyanate, carboxyl, and uretidione. The '983 patent process reacts a polyisocyanate mixture with a hydroxy acid component to give incorporation of 0.01–15% carboxyl groups, 2–40% isocyanate, and 1–23% uretidione. The composition disclosed in the '983 patent is claimed to be usable as a waterborne coating. When this composition is dispersed in water, the isocyanate functionality reacts rapidly with water, decomposing, and giving off carbon dioxide (foaming vigorously). Of the relevant examples, all but one employs the polyisocyanate in organic solvent to cast a coating. The hardness of these coatings is increased by heating at 140° C. for ½ hour. These conditions thermally dissociate uretidione groups into two isocyanate moieties that can react with isocyanate reactive groups; however, this type of dissociation breaks the polymer chain and generally causes extension by reaction with isocyanate reactive moieties (which, in the case of the aqueous dispersion, can form when the polymer is dispersed in water) and some cross-linking. Only Example 1 uses an aqueous dispersion of the polyisocyanate mixture to make a coating; the isocyanate foamed for an hour as it reacted with water. The hardness of this coating is increased by heating at 140° C. for ½ hour; presumably via thermal dissociation. Hardness is the only physical property of the coating (which was derived from an aqueous dispersion) that is disclosed.

New aqueous dispersions of polyurethanes providing improved physical properties for ACS applications, relative to the above-described prior art compositions such as those described in the '895 patent, would be highly desired by the ACS community. The present invention provides improved compositions. The improvements are believed to be due to cross-links, formed under very mild conditions, by reaction of polyamine and uretidione moieties, that are built into the polymer. This forms polar biuret moieties, that are subject to hydrogen bonding, thereby also providing physical cross-links. Polyols are less reactive, however, they may be used if a catalyst is employed. This process does not degrade the polymer, increasing molecular weight, by forming cross-links between polymer chains. Secondary physical cross-links may be formed by interaction of carboxylate groups with polyamine.

The waterborne polyurethanes of the present invention are "environmentally friendly", in that they can be cured with a minimal release of "Volatile Organic Compounds" (VOC's) at room temperature (minimum energy is consumed in the curing process).

SUMMARY OF THE INVENTION

In one aspect, the present invention relates to a composition being an aqueous dispersion of polyurethane in water, said composition comprising water and the reaction product of:
- (a) a water-dispersible isocyanate-terminated polyurethane prepolymer having an isocyanate content of between about 1.0 and 15% by weight; made by reacting an organic polyisocyanate adduct mixture comprised of a dimer (and optionally a trimer and/or a diisocyanate) having an average isocyanate functionality of between 2 and 4, and a polyol; and,
- (b) an isocyanate reactive chain-extender/cross-linker, in an amount sufficient to provide an isocyanate reactive moiety to isocyanate index of between 50 and 250 (preferably between 70 and 150, more preferably between 90 and 140). The isocyanate reactive moiety to isocyanate index is defined as 100 times the number of molar equivalents of isocyanate reactive moiety divided by the number of molar equivalents of isocyanate.

In another aspect, the present invention relates to a process for preparing an aqueous dispersion of polyurethane which comprises reacting, in an aqueous medium, a reaction mixture comprising:
- (a) a water-dispersible isocyanate-terminated polyurethane prepolymer having an isocyanate content of between about 1.0 and 15% by weight; made by reacting an organic polyisocyanate adduct mixture comprised of a dimer (and optionally a trimer and/or a diisocyanate) having an average isocyanate functionality of between 2 and 4, and a polyol; and,
- (b) with an isocyanate reactive chain-extender/cross-linker, in an amount sufficient to provide an isocyanate reactive moiety to isocyanate index of between 50 and 250 (preferably between 70 and 150, more preferably between 90 and 140).

In yet another aspect, the present invention relates to a method for coating a substrate which comprises contacting the substrate with a coating composition comprising a dispersion in water of the reaction product of:
- (a) a water-dispersible isocyanate-terminated polyurethane prepolymer having an isocyanate content of between about 1.0 and 15% by weight; made by reacting an organic polyisocyanate adduct mixture comprised of a dimer (and optionally a trimer and/or a diisocyanate) having an average isocyanate functionality of between 2 and 4, and a polyol.
- (b) an isocyanate reactive chain-extender/cross-linker, in an amount sufficient to provide an isocyanate reactive moiety to isocyanate index of between 50 and 250 (preferably between 70 and 150, more preferably between 90 and 140).

Preferably, the water-dispersible isocyanate-terminated polyurethane prepolymer (i.e., component (a) described in the above-mentioned composition, process and method claims) comprises the reaction product of:
- (i) organic polyisocyanate(s) containing at least some uretidione moieties,
- (ii) a polyol component comprising a polymeric diol having a molecular weight in the range of from 250 to 5000, and
- (iii) a compound containing a hydrophilic center and at least two isocyanate-reactive groups.

In other aspects of the present invention, components employed in the above described composition, process, and method, are suitably combined, to provide a polyurethane prepolymer having at least a portion of the dimer incorporated into the prepolymer.

These and other aspects will become apparent upon reading the following detailed description of the invention.

DETAILED DESCRIPTION OF THE INVENTION

It has now been surprisingly found by the present inventors, in accordance with the present invention, that the use of a water-dispersible isocyanate-terminated polyurethane prepolymer for the preparation of aqueous polyurethane dispersions, provides a polyurethane that, exhibits enhanced physical properties, such as increased modulus, and hardness, relative to the properties provided by prior art water-dispersible polyurethanes. The prepolymer is prepared from a polyisocyanate adduct mixture, comprised of the reaction product of a polyisocyanate dimer (uretidione), and a polymer that contains one or more isocyanate reactive functionalities. A preferred embodiment includes some trimer (isocyanurate).

Another very surprising finding associated with the present invention relates to the use of amine chain-extenders/cross-linkers in the preparation of aqueous polyurethane dispersions of this invention. Without wishing to be bound by any particular theory, the present inventors speculate that this system depends upon secondary cross-linking, to provide enhanced coating properties, either (a) when preparing the dispersion, or (b) at a later time, optionally using a different polyamine than that used to prepare the dispersion.

When using an amount of amine chain-extender sufficient to provide an excess of molar equivalents of amine groups relative to the number of molar equivalents of free isocyanate groups provided by the organic polyisocyanate adduct mixture, ring opening of the uretidione in the polyisocyanate adduct mixture has been found to occur. This provides a final polyurethane product characterized by increased cross-linking, relative to the final product produced in the absence of a molar excess of amine to isocyanate groups, without the necessity of elevated temperature. It has surprisingly been found that primary amines provide this cross-linking at relatively low temperatures and mild reaction conditions. Although in the broadest aspect of the present invention, the isocyanate reactive moiety to isocyanate index is suitably selected within a range of between about 50 and about 250, particular advantage is provided by utilizing an excess of molar equivalents of amine groups relative to the number of molar equivalents of free isocyanate groups provided by the organic polyisocyanate adduct mixture. Preferably, the number of molar equivalents of amine is sufficient to afford an isocyanate reactive moiety to isocyanate index of between 50 and 250 (more preferably between 70 and 150, most preferably between 90 and 140).

The polyisocyanates that can be used in making the isocyanate-terminated prepolymer employed in the present invention may be aliphatic, cycloaliphatic, araliphatic or aromatic polyisocyanate. Examples of suitable polyisocyanates include ethylene diisocyanate, 1,4-butane diisocyanate, 1,6-hexamethylene diisocyanate, isophorone diisocyanate, cyclohexane-1,4-diisocyanate, 4,4'-dicyclohexylmethane diisocyanate, m- and p-tetramethylxylene diisocyanates, p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates, 1,5-naphthalene diisocyanate. Mixtures of polyisocyanates can be used and also polyisocyanates which have been modified by the introduction of urethane, allophanate, urea, biuret, carbodiimide, uretonimine or isocyanurate moieties.

The polyol employed to make the isocyanate-terminated prepolymer is suitably a high molecular weight polyol, preferably having a number average molecular weight of between about 250 and about 10,000, preferably between 400 and 3,000. Examples of the high molecular weight compounds include:

1) Polyhydroxy polyesters which are obtained from polyhydric, preferably dihydric alcohols to which trihydric alcohols may be added and polybasic, preferably dibasic carboxylic acids. Instead of these polycarboxylic acids the corresponding carboxylic acid anhydrides or polycarboxylic carboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacid acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include ethylene glycol, 1,2- and 1,3 propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethylcyclohexanes, glycerine and trimethylolpropane.

2) Polylactones generally known from polyurethane chemistry, e.g., polymers of ε-caprolactone initiated with the above-mentioned polyhydric alcohols.

3) Polycarbonates containing hydroxyl groups such as the products obtained from reaction of the polyhydric alcohols previously set forth for preparing the polyhydroxy polyesters preferably dihydric alcohols such as 1,3-propanediol, 1,4-butanediol, 1,4-dimethylol cyclohexane, 1,6-hexanediol, diethylene glycol, triethylene glycol or tetraethylene glycol) with phosgene, diaryl carbonates such as diphenyl carbonate or cyclic carbonates such as ethylene or propylene carbonate. Also suitable are polyester carbonates obtained by the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than 10% by weight of ethylene oxide. Suitable starting compounds containing at least one reactive hydrogen atom include the polyols set forth as suitable for preparing the polyhydroxy polyesters and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include ethylene diamine, diethylene triamine, triethylene tetraamine, 1,6-hexanediamine, piperazine, 2,5-dimethylpiperazine, 1-amino-3-aminomethyl-3,5,5-trimethylcyclohexane, bis(4-aminocyclohexyl) methane, bis(4-amino-3-methylcyclohexyl) methane, 1,4-cyclohexanediamine, 1,2-propanediamine, hydrazine, amino acid hydrazides, hydrazides of semicarbazido carboxylic acids, bis-hydrazides and bis-semicarbazides, ammonia, methylamine, tetramethylenediamine, ethanolamine diethanolamine, triethanolamine, aniline, phenylenediamine, 2,4- and 2,6-toluenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups. Compounds containing isocyanate reactive-NH groups are much less preferred.

In order to render the polyurethanes water-disperible and enable formation of the dispersions of the present invention, it is necessary to chemically incorporate hydrophilic groups, i.e., anionic groups, potential anionic groups or nonionic hydrophilic groups, into the isocyanate-terminated prepolymer component. Suitable hydrophilic components contain at least one (preferably at least two) isocyanate-reactive group and at least one hydrophilic group or potential hydrophilic group. Examples of compounds which may be used to incorporate potential ionic groups include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below 400. It should be emphasized that the carboxylic acid groups are not considered to be isocyanate-reactive groups due to their sluggish reactivity with isocyanates and the reaction conditions used to prepare the prepolymers.

The preferred anionic groups for incorporation in to the polyurethanes in accordance with the present invention are carboxylate groups and these groups may be introduced by using hydroxy-carboxylic acids of the general formula:

(HO)$_x$Q(COOH)$_y$ wherein Q represents a straight or branched, hydrocarbon radical containing 1 to 12 carbon atoms, and x and y represent values from 1 to 3. Examples of these hydroxy-carboxylic acids include citric acid and tartaric acid.

The preferred acids are those within the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

Q'—C(CH$_2$OH)$_2$COOH wherein Q' is hydrogen or an alkyl group containing 1 to 8 carbon atoms. The most preferred compound is α,α-dimethylol propionic acid, i.e., wherein Q' is methyl in the above formula.

The acid groups may be converted into hydrophilic anionic groups by treatment with a neutralizing agent such as an alkali metal salt, ammonia or primary, secondary or preferably tertiary amine in an amount sufficient to render the hydroxy functional polyurethanes water dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile organic compounds such as volatile amines since they lead to reduced resistance to water swell in the coatings or other ACS product produced from the water dispersible compositions of the present invention. Therefore, less than 50%, preferably less than 20% and most preferably none of the acid groups should be neutralized with alkali metals.

In addition, the use of tertiary amines that are relatively volatile is preferred in order to facilitate easy removal of the tertiary amine component during curing of the polyurethane composition. The preferred volatile amines for neutralizing the acid groups are the tertiary amines, while ammonia and the primary and secondary amines are less preferred. Examples of suitable amines include trimethylamine, triethylamine, trisopropylamine, tributylamine, N,N-dimethyl-cyclohecylamine, N,N-dimethylstearylamine, N,N-dimethylaniline, N-methylmorpholine, N-ethylmorpholine, N-methylpiperazine, N-methylpyrrolidine, N-methylpiperidine, N,N-dimethylethanolamine, N,N-diethylethanolamine, triethanolamine, N-m ethyldi ethanolamine, dimethylaminopropanol, 2-methoxyethyldimethylamine, N-hydroxyethylpiperazine, 2-(2-dimethylaminoethoxy) ethanol and 5-diethylamino-2-pentanone. The most preferred tertiary amines are those which do not contain isocyanate-reactive groups as determined by the Zerewitinoff test.

The acid groups on component (iii) of the isocyanate-terminated prepolymer may be converted into hydrophilic anionic groups by treatment with the alkali metal or preferably volatile amine either before, during or after their incorporation into the prepolymer. However, it is preferred to neutralize the acid groups after their incorporation.

The dispersions of the present invention can be facilitated/stabilized by the use of surfactants, dispersants, defoamers, and the like. The need for incorporation of one or more of these can be determined by one skilled in the coating art.

The polyisocyanate adduct useful in the present invention is suitably made from a mixture, blend, or separately added combination of polyisocyanate dimer, alone, or in combination with polyisocyanates. In a preferred embodiment of the present invention the polyisocyanate adduct includes trimers. Preferred isocyanurates can be prepared from the previously described aliphatic and/or cycloaliphatic diisocyanates. Particularly preferred are isocyanato-isocyanurates based on 1,6-hexamethylene diisocyanate, 4,4'-dicyclohexylmethane diisocyanate, and/or 1-isocyanato-3,3,5-trimethyl-5-isocyanatomethylcyclohexane. The production of these isocyanurate group-containing polyisocyanates is described, for example, in DE-PS 2,616,416, EP-OS 3,765, EP-OS 10,589, EP-OS47,452, U.S. Pat. No. 4,288,586 and U.S. Pat. No. 4,324,879. The isocyanato-isocyanurates generally have an average isocyanate functionality of 3 to 3.5 and an isocyanate content of 5 to 30%, preferably 10 to 25% and most preferably 15 to 25% by weight.

Suitable dimers include uretidione diisocyanates prepared from the previously described aliphatic and/or cycloaliphatic diisocyanates. The uretidione diisocyanates are preferably prepared from 1,6-hexamethylene diisocyanate, 4,4'dicyclohexylmethane diisocyanate, and isophorone diisocyanate. Although the uretidione diisocyanates can be used as the sole component of the polyisocyanate adduct, one preferred embodiment of the present invention requires that at least some amount of polyisocyanate also be present as part of the polyisocyanate adduct mixture.

Another preferred embodiment of the present invention employs, in addition to the dimer, trimer, urethane, and/or allophanate group-containing polyisocyanates prepared from the previously described aliphatic and/or cycloaliphatic diisocyanates, preferably 1,6-hexamethylene diisocyanate, 4,4'-dicyclohexylmethane diisocyanate, or isophorone diisocyanate, by reacting excess quantities of the diisocyanates with the previously described low molecular weight polyols, preferably trimethylol propane, glycerine, 1,2-dihydroxy propane or mixtures thereof, are also suitably employed in fabricating the polyisocyanate adducts, if desired. If used, the urethane and/or allophanate group-containing polyisocyanates have a most preferred isocyanate content of 12 to 20% by weight and an (average) isocyanate functionality of 2.5 to 3. Likewise, oxadiazinetrione groups can be employed, if desired, in the preparation of the polyisocyanate adducts useful in the present invention, such as, for example, those prepared from 1,6-hexamethylene diisocyanate.

An amine chain-extending and/or an amine/cross-linking agent is preferably employed in accordance with the present invention. Examples of useful amine chain extenders/chain-lengthening agents are low-molecular-weight polyamines. Useful polyamines include, but are not limited to, aliphatic polyamines such as ethylenediamine, 1,4-diaminobutane, N-hydroxyethyl-ethylenediamine, tetramethylenediamine, hexamethylenediamine, triethylenetetramine, 4-aminomethyl-1,8-diaminooctane, the "Dyteks", and diethylenetriamine; alicyclic polyamines such as 4,4'-diaminodicyclohexylmethane, 1,4-diaminocyclohexane and isophoronediamine; polymeric polyamines, such as the "Jeffamines"; aliphatic polyamines having an aromatic ring, such as xylylenediamine and tetramethylxylylenediamine; aromatic polyamines such as 4,4'-diaminodiphenylmethane, tolylenediamine, benzidine and phenylenediamine; and inorganic diamines such as hydrazines; and mixtures of at least two of these polyamines. Other useful isocyanate-reactive amine-type chain-extenders and/or cross-linkers include the polyhydrazides (e.g., adipic dihydrazide). The amount of the chain lengthening agent is usually 0.3 to 30 wt. %, preferably 0.5 to 20 wt. %, based on the prepolymer.

A molar excess of the polyamine, above that required to react with all available isocyanate, can then react with uretidione groups that are in the polymer structure; this is believed to be the mechanism of cross-linking in this system. The difference in the rate of reaction of primary verses secondary amines can be advantageously utilized. Dispersions that have been extended by adding a molar amount of the polyamine or that have extended by hydrolysis, still contain uretidione that can be cross-linked when desired. This can be achieved by adding more polyamine, utilizing a less reactive polyamine, or a "protected polyamine". For example ketimine and/or aldamine derivatives can be used. Protected polyamines that can be employed include, but are not limited to, the polyimine derivatives of the forementioned extenders/cross-linkers. A list of these can be found in U.S. Pat. Nos.: 3,440,077; 3,425,964; 3,567,692, 3,589, 932; 3,793,417. For the purpose of this invention, polyimines suitable must be stabile in the aqueous dispersion until it is cured. To facilitate cross-linking, when the forementioned polyimines are employed, a catalyst may be used; for example acids can be used. Any "protected polyamine", that is stabile in the aqueous dispersion, and can be decomposed to free polyamine, can be employed. A list of such "protected polyamines" can be found in "Protective Groups in Organic Synthesis", pages 218–287, by T. W. Greene (copyright John Wiley, New York, 1981). Another variation of the present invention uses the hydrolysis of a portion of the dispersed prepolymer to form amine groups, that can react with isocyanate, extending the polymer; some cross-linking and branching can also occur.

Other chain-extenders/cross-linkers containing isocyanate-reactive moieties, such as polyols, can be used in the presence of catalysts. Catalysts that can be used include, but are not limited to, amines (preferably secondary or tertiary), tin salts, organic bases, and inorganic bases.

In order to reduce the viscosity or to aid the dispersivity of the water dispersible polyisocyanates, an organic solvent may be added. Solvents that can be employed include, but are not limited to, any organic solvent that does not react with isocyanate or uretidione. Preferred solvents include ketones, pyrolidones, esters, ethers, aromatics, and aliphatic hydrocarbons. Most preferred solvents are those that are low boiling and/or water dispersible or soluble.

If solvent-free waterborne dispersions are desired, the prepolymer can be made without solvent or a volatile solvent can be removed prior to or after dispersion in water.

The aqueous coating compositions according to the present invention may be applied to substrates using any of the various techniques known in the art, and the coating compositions are particularly suitable for ACS applications. In addition, the aqueous compositions may be blended with other types of resins optionally containing isocyanate-reactive groups or with amine- or phenol-formaldehyde condensates known in the art. They can also contain pigments, levelling agents, catalysts, and other auxiliaries known in the art. Examples of the application techniques, resins and auxiliaries are set forth in U.S. Pat. No. 4,408, 008, which is herein incorporated by reference.

The invention is further illustrated in, but is not intended to be limited by, the following examples in which all parts and percentages are by weight unless otherwise specified.

EXAMPLE 1

(Comparative Example)

Patent Literature Control Experiment—Coating Composition Prepared using an HDI Biuret-terminated Prepolymer. Prepared in Accordance with Example 1 of U.S. Pat. No. 5,169,895

Into a 2000 ml resin kettle equipped with a stirrer, heating mantle, thermometer, and nitrogen inlet, was charged 375 g (0.3790 eq.) of an ethylene adipate diol, 28.05 g (0.4183 eq.) of dimethylol propionic acid, 165.9 g (1.265 eq.) dicyclohexylmethane-4,4'-diisocyanate, 142.5 g of N-methyl-2-pyrrolidinone and 0.6 g of dibutyl tin dilaurate. The system was stirred and heated to 80° C. for 2.5 hrs. The reactor was cooled to 60° C. and maintained for 1.5 hrs and 103.75g (0.5337 eq.) Desmodur® N-100 (biuret of 1,6-hexamethylene diisocyanate) and 21.15 g (0.2090 eq.) of triethylamine was added and maintained at 60° C. for 1.5 hrs after which time 250 g of the prepolymer reaction mixture was poured into 431.9 g water containing 2.5 g of Triton X-350 surfactant, and dispersed. After five minutes 7.09 g of 64% hydrazine was added, and the mixture dispersed.

Test specimens for physical property determination were made by drawing thin films on tin coated plates and on cold rolled steel plates coated with an ECOAT and a primer.

EXAMPLE 2

Coating Composition Prepared using a 1,6-hexmethylene diisocyanate dimer Terminated Prepolymer, Versus Control Experiment This experiment was run under the same conditions and with the same ratio of reactants as Example 1 above, except the amounts were scaled back to those indicated.

Into a 1000 ml resin kettle equipped with a stirrer, heating mantle, thermometer, and nitrogen inlet, was charged 158.02 g (0.157 eq.) of an ethylene adipate diol, 11.82 g (0.1762 eq.) of dimethylol propionic acid, 70.65 g (0.533 eq.) dicyclohexylmethane-4,4'-diisocyanate, 60.04 g of N-methyl-2-pyrrolidinone and 0.25 g of dibutyl tin dilaurate. The system was stirred and heated to 80° C. for 2.5 hrs. The reactor was cooled to 60° C. and maintained for 1.5 hrs and 44.42 g (0.241 eq.) of 1,6-hexamethylene diisocyanate dimer and 8.92 g (0.0881 eq.) of triethylamine was added and maintained at 60° C. for 1.5 hrs after which time 316 g of the prepolymer reaction mixture was poured into 542.82 g water containing 3.16 g of Triton X-301 surfactant, and dispersed. After five minutes 9.31 g of 64% hydrazine is added and the mixture dispersed.

TABLE 1

Comparison of Physical Properties of Coatings Made from HDI/Biuret versus HDI/Dimer

| Property | Example #1 | Example #2 |
|---|---|---|
| NH2/NCO Ratio | 1.05 | 1.25 |
| Modulus psi at | | |
| 100% | 2980 | 2590 |
| 200% | NA | 3860 |
| Tensile strength psi | 3120 | 5800 |
| Elongation | 95 | 290 |

"NA" denotes not applicable.

Discussion of the Results for the Above Examples

In Example 1, the prepolymer is isocyanate terminated but contains no uretidione moieties. When it was extended with a diamine, normal chain extension reaction occurred between terminal isocyanate groups with the diamine. On the other hand, Example 2 contains uretidione moieties in the polyurethane backbone, in addition to the isocyanate terminal groups. During the chain extension reaction, these uretidione moieties reacted with the excess hydrazine. Since in Example 2, uretidione moieties are concentrated at both ends of the polyurethane backbone; the reaction of excess diamine and uretidione can further extend the length of the polyurethane chains. This results in an increase of not only modulus, but also elongation, and ultimate tensile strength.

EXAMPLE 3

Coating Composition Prepared using a Polyester Diol, Isophorone Diisocyanate, and 1,6-hexmethylene diisocyanate dimer.

Into a 3-necked round bottom flask that was purged with nitrogen, were charged isophorone diisocyanate (65.48 g, 0.5891 eq.), 1,6-hexamethylene diisocyanate dimer (45.73 g, 0.2529 eq.), dimethylol propionic acid (16.29 g, 0.2429 eq.), polyester polyol Rucoflex S105-110 (158.25 g, 0.3214 eq.), methylethyl ketone (64.05 g) and dibutyltin dilaurate (0.19 g). The mixture was stirred, under nitrogen, and heated to 80° C. for 3.5 hours. The percentage of free isocyanate was measured and found to be 3.0% theoretical 3.3%).

In a 1000 ml beaker was charged 175 g water and triethylamine (4.21 g, 0.416 eq.), and the solution was mixed. To the water mixture was added slowly 120 g (0.0860 eq.) of the prepolymer described above. The mixture was stirred thoroughly to form an aqueous dispersion.

In a separate beaker 30 g of water and ethylene diamine (2.45 g, 0.0817 eq.) were added, and mixed. The ethylene diamine and water mixture was added to the dispersion in the 1000 ml beaker, producing a translucent, low viscosity system. The ratio of amine equivalents (0.0817) to isocyanate equivalents (0.0860) was .95 or an index of 95 in this formulation.

Test specimens for physical property determination were made by drawing thin films on tin plates, and on cold rolled steel plates coated with an ECOAT and a primer. The coatings on the tin plates were removed from the plate; tensile and elongation values were obtained on an Instron (see Table 2). Coatings on the cold rolled steel substrate were tested for a variety of physical properties, chemical, and solvent resistance see Table 3.

EXAMPLES 4–6

The prepolymer described in Example 3 was extended with different amounts of ethylene diamine to see the effect of $NH_2$ to NCO index. The same procedure described above was used.

The physical properties are listed in Table 2 and the coating physical properties, chemical, and solvent resistance properties are in Table 3.

EXAMPLES 7–12

The prepolymer described in Example 3 was extended/cross-linked with two other amine chain-extenders, hydrazine and isophorone diamine (IPDA), and the $NH_2$/NCO index was varied between 95 and 149. The tensile elongation properties are reported in Table 2 and the coating physical properties, chemical, and solvent resistance properties are in Table 3. Example 12 was carried out as above, except only IPDI was used to prepare the prepolymer (no uretidione); this was a control.

Discussion of the Results for the Above Examples

The coatings prepared with ethylene diamine, hydrazine, and isophorone diamine chain extenders all showed evidence of increased crosslinking of the polymer chains, as indicated by the increase in tensile modulus and a decrease in elongation as the $NH_2$/NCO index went up (see Table 2) with increasing levels of added diamine.

Figure 1:
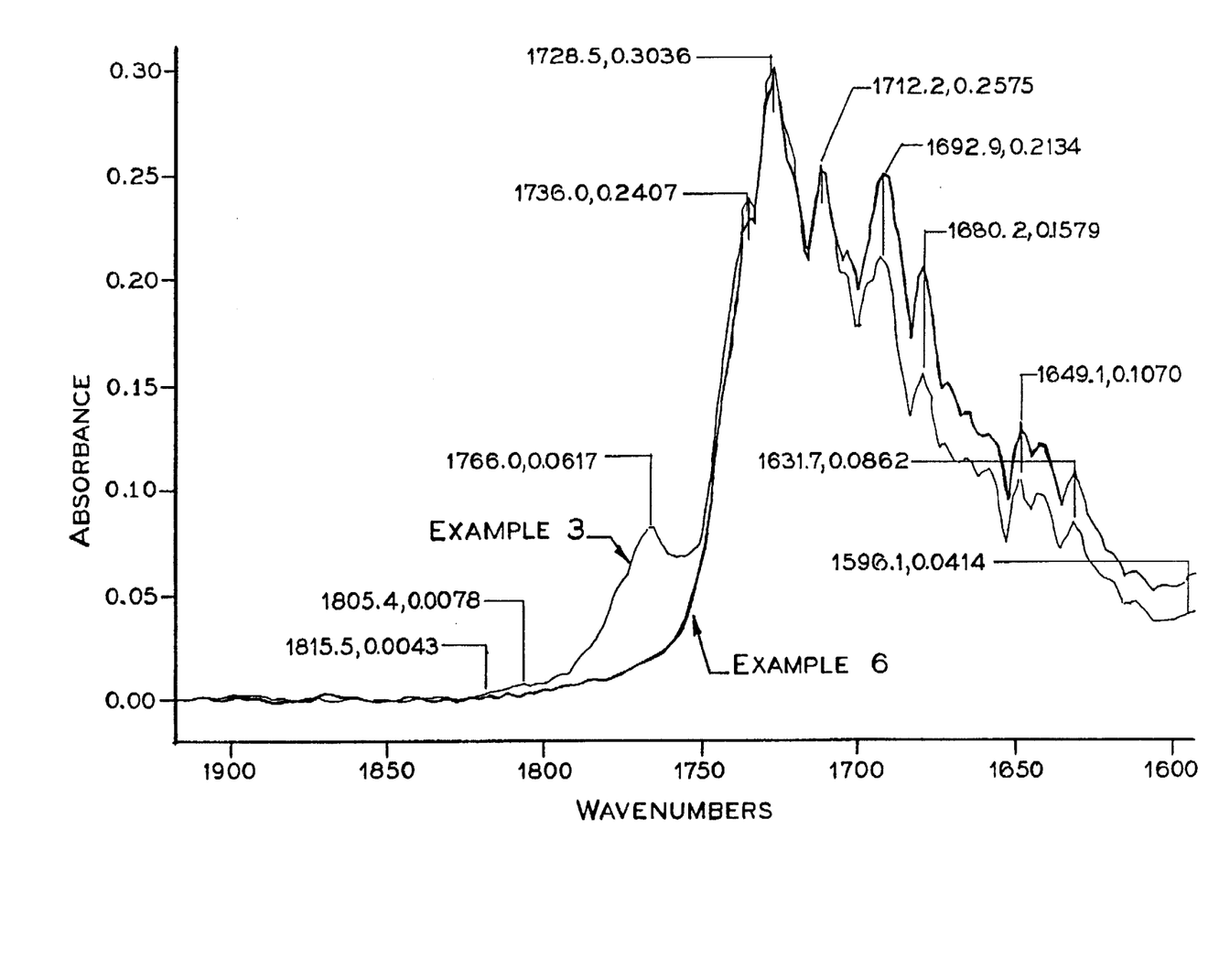
The FIGURE illustrates Fourier Transform Infrared (FTIR) Spectra for the coatings of Examples 3 and 6 as described in more detail hereinbelow.

To demonstrate that excess amine is reacting with the uretidione ring to form additional cross-links, FTIR spectra of coatings from Examples 3 and 6 were run on a heated ATR sample holder. The infrared spectrum from the coating of Example 3, ethylene diamine extended with 95 index, showed a relatively strong uretidione carbonyl absorbance at 1766 $cm^{-1}$. The coating from Example 6, which had an excess of ethylene diamine chain extender added ($NH_2$/NCO index 149), showed no absorbance at 1766 $cm^{-1}$ in the infrared spectrum (see FIG. 1) indicating that the uretidione ring was no longer intact.

TABLE 2

Coating Tensile/Elongation Properties

| Example | Diamine Extender | NH₂/NCO₂ index | Tensile Modulus (psi) 100% | 200% | 300% | Tensile Strength (psi) | Elongation % |
|---|---|---|---|---|---|---|---|
| 3 | EDA | 95 | 915 | 1480 | 2555 | 5285 | 484 |
| 4 | EDA | 111 | 1325 | 2220 | 4095 | 4810 | 330 |
| 5 | EDA | 125 | 1530 | 2680 | — | 4014 | 255 |
| 6 | EDA | 149 | 2610 | — | — | 3000 | 125 |
| 7 | NH₂NH₂ | 95 | 1410 | 3140 | 5675 | 6760 | 330 |
| 8 | NH₂NH₂ | 149 | 1885 | 3970 | — | 6180 | 260 |
| 9 | IPDA | 95 | 2050 | 4070 | — | 5870 | 255 |
| 10 | IPDA | 111 | 2645 | — | — | 3830 | 150 |
| 11 | IPDA | 125 | 3105 | — | — | 3660 | 125 |
| 12 | EDA | 95 | 1353 | 2428 | 4120 | 6945 | 463 |

TABLE 3

Coating Mechanical Properties

| Example | Pencil Hardness | Impact (RT) Direct/Rev | Impact (−17° C.) | Xylene Rubs | Gloss 20°/60° Before QUV | Gloss 20°/60° After QUV |
|---|---|---|---|---|---|---|
| 3 | 0 | 160/160 | 160/160 | F | 80.5/89.9 | 80.4/88.3 |
| 4 | 0 | 160/160 | 160/160 | F | 80.5/90.1 | 85.0/92.5 |
| 5 | 0 | 160/160 | 160/160 | F | 77.9/89.2 | 84.3/91.9 |
| 6 | 0 | 160/160 | 95/10 | F | 82.5/90.3 | |
| 7 | 0 | 160/160 | 160/160 | F | 81.1/90.2 | 76.9/89.5 |
| 8 | 0 | 160/160 | 160/160 | F | 82.5/90.9 | |
| 9 | 0 | 160/160 | 160/160 | F | 25.3/62.3 | |
| 10 | 2 | 160/160 | 130/40 | P | 13.2/46.1 | |
| 11 | 2 | 160/160 | 60/15 | P | 20.6/57.7 | |
| 12 | 0 | 160/160 | 160/160 | F | 78.5/89.2 | 77.7/90.2 |

Note: Examples 3–12 all passed the Conical Mandrel Bend, the Adhesion Tests, HCl (10%), and Acetic Acid (10%).

EXAMPLE 13–15

The procedure of Example 3 was followed using: isophorone diisocyanate (91.86 g, .8265 eq.), 1,6-hexamethylene diisocyanate dimer (64.54 g, .3473 eq.), dimethylol propionic acid (18.40 g, .2744 eq.), Rucoflex S105-210 (123.00 g, .4657 eq.), methylethyl ketone (70.55 g), and dibuthytin dilaurate (.18 g). After the percentage of free isocyanate was measured and found to be 4.65% (Theoretical 5.0%), a solution (1156.9 g) of triethylamine (13.70 g, .1354 eq.) in water was added with vigorous mixing. After 1.5 hours, the solution was divided into three portions of 200 ml each and placed in 1000 ml beakers. These were mixed with various amounts of ethylenediamine in 10 g of water. Two of the portions were extended/cross-linked by addition of various amounts of ethylenediamine, one (Example 13) was allowed to extend by reaction with water (no amine added). Coatings were spread on glass and steel plates; tensile/elongation samples were lifted off of the glass plates.

TABLE 4

Coating Tensile/Elongation Properties

| # | Index NH₂NCO | Pencil Hardness | MEK Resistance | Modulus 100% | Tensile Strength | Ultimate Elongation |
|---|---|---|---|---|---|---|
| 13 | none | 3 | P | 2900 | 3450 | 210 |
| 14 | 103 | 4 | P | 3250 | 4903 | 183 |
| 15 | 110 | 4 | P | 3817 | 5590 | 208 |

Note: All of the above passed the Conical Mandrel Bend Test. All of the above did not dissolve (1%) in N,N-dimethylformamide at 50° C.

Table 4 illustrates the increase in modulus at 100% elongation, associated with increased cross-links. Example 13 illustrates self extension, due to hydrolysis of isocyanate groups to amine groups, and subsequent reaction with intact isocyanate groups. Titration of the dispersion in Example 13 indicated the uretidione was intact.

EXAMPLE 16–20

The procedure of Example 3 was followed using: isophorone diisocyanate (45.90 g, .4130 eq.), HDI (34.92 g, .4152 g), 1,6-hexamethylene diisocyanate dimer (64.37 g, .3464 eq.), dimethylol propionic acid (18.48 g,.2756 eq.), Rucoflex S105-210 (123.05 g,.4703 eq.), methylethyl ketone (35.35 g), N-methylpyrrollidone (35.02 g), and dibuthytin dilaurate (.19 g). After 2 hours the percentage of free isocyanate was measured and found to be 4.68%. Portions of this "prepolymer" were dispersed, and extended/cross-linked as in Example 3. The properties are shown in Tables 5 and 6.

TABLE 5

Coating Tensile/Elongation Properties

| Example | Diamine Extender | NH₂/NCO₂ index | Tensile Modulus (psi) 100% | Tensile Strength (psi) | Elongation % |
|---|---|---|---|---|---|
| 16 | EDA | 104 | 2467 | 4949 | 210 |
| 17 | EDA | 110 | 3134 | 3650 | 130 |
| 18 | EDA | 125 | — | 3628 | <100 |

Table 5 illustrates the modulus increase when uretidione moieties are cross-linked with diamine. The modulus of Example 16, which is extended by using only an equivalent amount of diamine, can be increased by crosslinking with excess diamine (see Examples 17 and 18).

TABLE 6

Coating Mechanical Properties

| # | AMINE INDEX NH$_2$/NCO | HARDNESS Koenig (sec) | MEK 200 RUBS | IMPACT DIR./REV | MANDREL BEND | GLOSS 20/60 | SOLVENT RESISTANCE XYLENE | HOAc | NaOH | HCl |
|---|---|---|---|---|---|---|---|---|---|---|
| 16 EDA | 104 | 38 | SI MAR | 160/160 | P | 81.7/91.2 | P | P | Si Mark | P |
| 17 EDA | 109 | 43 | SI MAR | 160/160 | P | 82.6/91.4 | P | P | P | P |
| 18 EDA | 123 | 54 | PASS | 160/160 | P | 82.1/91.5 | P | P | P | P |
| CROSS-LINKED #16 in a second step | | | | | | | | | | |
| 19 EDA | 125 | 63 | PASS | 160/160 | P | 83.5/91.6 | P | P | Si Mark | P |
| 20 D-230 | 141 | 71 | MAR | 160/160 | P | 82.0/91.3 | P | P | P | P |

Table 6 illustrates the improvement in hardness and solvent resistance by cross-linking with a diamine. For Example 16, which is extended by using only an equivalent amount of diamine, the hardness and solvent resistance can be improved by crosslinking with excess diamine (see Examples 17–20).

EXAMPLE 21

(Comparative Example)

The procedure of Example 3 was followed using a 500 ml resin kettle containing: isophorone diisocyanate (39.11 g, .3519 eq.), dimethylol propionic acid (5.56 g, .0830 eq.), Rucoflex S105-210 (36.94 g, .1399 eq.), methylethyl ketone (21.58 g), and dibuthytin dilaurate (.06 g). After the percentage of free isocyanate was measured and found to be 5.7% (Theoretical 5.3%), a solution (237.0 g) of triethylamine (4.91 g, .0485 eq.) in water was added with vigorous mixing. A 200.0 g portion of this dispersion was stirred with 1.87 g ethylenediamine in 10.0 g water; an index of 102.

The physical properties of coatings made from Example 21 were dissolved (1%) in N,N-dimethylformamide at room temperature; failed the MEK rub test; failed the MEK solvent resistence test; showed impact test results of 160/90. This Example illustrates the inferior properties, especially solvent resistance, when chemical cross-linking is not possible.

EXAMPLE 22

(Comparative Example)

The procedure of Example 3 was followed using: isophorone diisocyanate trimer (92.83 g, .3947 eq.), dimethylol propionic acid (7.47 g, .1114 eq.), Rucoflex S105-210 (27.55 g, .1044 eq.), methylethyl ketone (22.2 g), and dibuthytin dilaurate (0.06 g). The percentage of free isocyanate was measured and found to be 6.4% (Theoretical 5.0%); at this point the mixture was too thick to stir. A solution (258.0 g) of triethylamine (5.67 g, 0.0560 eq.) in water was added with vigorous mixing. There was no dispersion, a hard solid, insoluble in toluene, was formed.

EXAMPLE 23

(Comparative Example)

The procedure of Example 3 was followed using: 1,6-hexamethylene diisocyanate trimer (74.10 g, .3900 eq.), dimethylol propionic acid (7.10 g, .1059 eq.), Rucoflex S105-210 (31.49 g, .1203 eq.), methylethyl ketone (22.2 g), and dibuthytin dilaurate (0.07 g). After an hour the reaction mixture solidified, rendering it unsuitable for waterborne dispersion.

Examples 22 and 23 illustrate the importance of using dimer to prepare the water-dispersible prepolymers of this invention. It also illustrates that in these systems, trimer can not be used by itself to prepare a usable water dispersible prepolymer.

Notes:

Chemicals employed herein:

D-230—Jeffamine® D-230
DMPA—Dimethylol propionic acid
DBTDL—Dibutyltin dilaurate (DABCO® T-12)
EDA—1,2-ethylene diamine
H$_{12}$MDI—Dicyclohexylmethane-4,4'-diisocyanate (Desmodur® W}
HDI—1,6-Hexamethylene diisocyanate
HDI Dimer—the 1,6-hexmethylene diisocyanate dimer used in these examples was Luxate® HD-100, a commercially available product from the Olin Corporation. It contains some HDI trimer.
IPDI—Isophorone diisocyanate (Luxate® IM)
NMP—N-methyl-2-pyrrolidinone
TEA—Triethylamine While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A method for coating a substrate which comprises contacting the substrate with a coating composition comprising a dispersion in water of the reaction product of:

(a) a water-dispersible isocvanate-terminated polyurethane prepolymer having an isocyanate content of between about 1 and 15% by weight made by reacting
   (i) an organic polyisocyanate adduct mixture comprising a dimer of diisocyanates containing uretdione and having an average isocyanate functionality of between 2.0 and 4.0 for said isocyanate dimer, and (ii) a polyol; and, (b) an isocyanate reactive chain-extender/cross-linker, in an amount sufficient to provide an isocvanate reactive moiety to isocyanate index of between 50 and 250, wherein said isocyanate reactive chain-extender/cross-linker is selected from the group consisting of primary amines, secondary amines, hydrazines, polyhydrazides, and combinations thereof, wherein said isocyanate reactive moiety to isocyanate index is between 90 and 150, and said excess of said chain extender/cross-linker is added to the dispersion in a subsequent step, and excess protected chain extender/cross-linker is added to the dispersion.

2. A method for coating a substrate which comprises contacting the substrate with a coating composition comprising a dispersion in water of the reaction product of:

(a) a water-dispersible isocyanate-terminated polyurethane prepolymer having an isocyanate content of between about 1 and 15% by weight made by reacting (i) an organic polyisocyanate adduct mixture comprising a dimer of diisocyanates containing uretdione and having an average isocyanate functionality of between 2.0 and 4.0 for said isocvanate dimer, and (ii) a polyol; and, (b) an isocyanate reactive chain-extender/cross-linker, in an amount sufficient to provide an isocyanate reactive moiety to isocyanate index of between 50 and 250, wherein said isocyanate reactive chain-extender/cross-linker is selected from the group consisting of primary amines, secondary amines, hydrazines, polyhydrazides, and combinations thereof, wherein said isocyanate reactive moiety to isocyanate index is between 90 and 150, and said excess of said chain extender/cross-linker is added to the dispersion in a subsequent step, and excess protected chain extender/cross-linker is added to the dispersion wherein said protected chain-extender/cross-linker is a polyaldamine or a polyketimine that is stably dispersed in the aqueous dispersion, and can release free polyamine.

3. The method of claim 2 wherein said water-disperible isocyanate-terminated polyurethane prepolymer comprises the reaction product of:

(i) an organic diisocyanate, (ii) a polyol component comprising a polymeric diol having a number average molecular weight in the range from 250 to 10,000, and (iii) a compound containing a hydrophilic center and at least two isocyanate-reactive groups.

4. The method of claim 3 wherein the compound of component (iii) is a dihydroxyalkanoic acid.

5. The method of claim 2 which additionally comprises a trimmer wherein the molar ratio of said trimer to said dimer is between about 1:10 and about 10:1 and wherein said isocyanate reactive moiety to isocyanate index is between 90 and 150.

6. The method of claim 5 wherein said trimer is selected from the group consisting of isocyanato-isocyanurated based on 1,4-tetramethylene diisocyanate, 1,6-hexamethylene diisocyanate, isophorone diisocyanate, and combinations thereof.

7. The method of claim 2 wherein said dimer is selected from the group consisting of isocyanato-uretdiones based on 1,4-tetramethylene diisocyanate, 1,6-hexamethylene diisocyanate, isophorone diisocyanate, 4,4'-diisocyanatodicyclohexylmethane, and combinations thereof.

* * * * *